(No Model.)   M. M. REEVES.   5 Sheets—Sheet 1.
CORN AND CANE HARVESTER.
No. 466,835.   Patented Jan. 12, 1892.
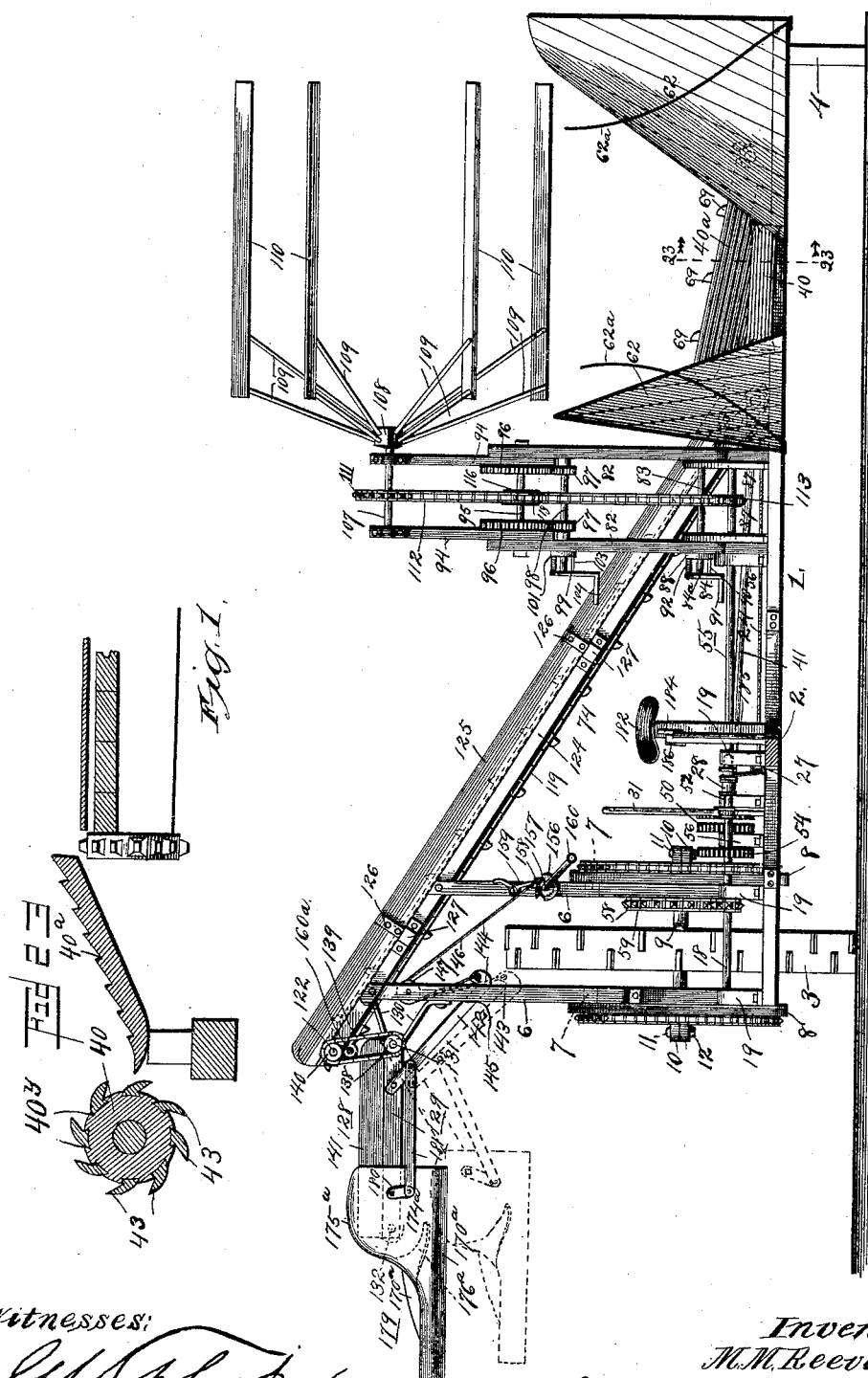
Witnesses:
G. L. Thorpe.
Jno. L. Condron.
Inventor
M. M. Reeves.
by
Higdon & Higdon,
Attorneys.

(No Model.) 5 Sheets—Sheet 2.
M. M. REEVES.
CORN AND CANE HARVESTER.
No. 466,835. Patented Jan. 12, 1892.
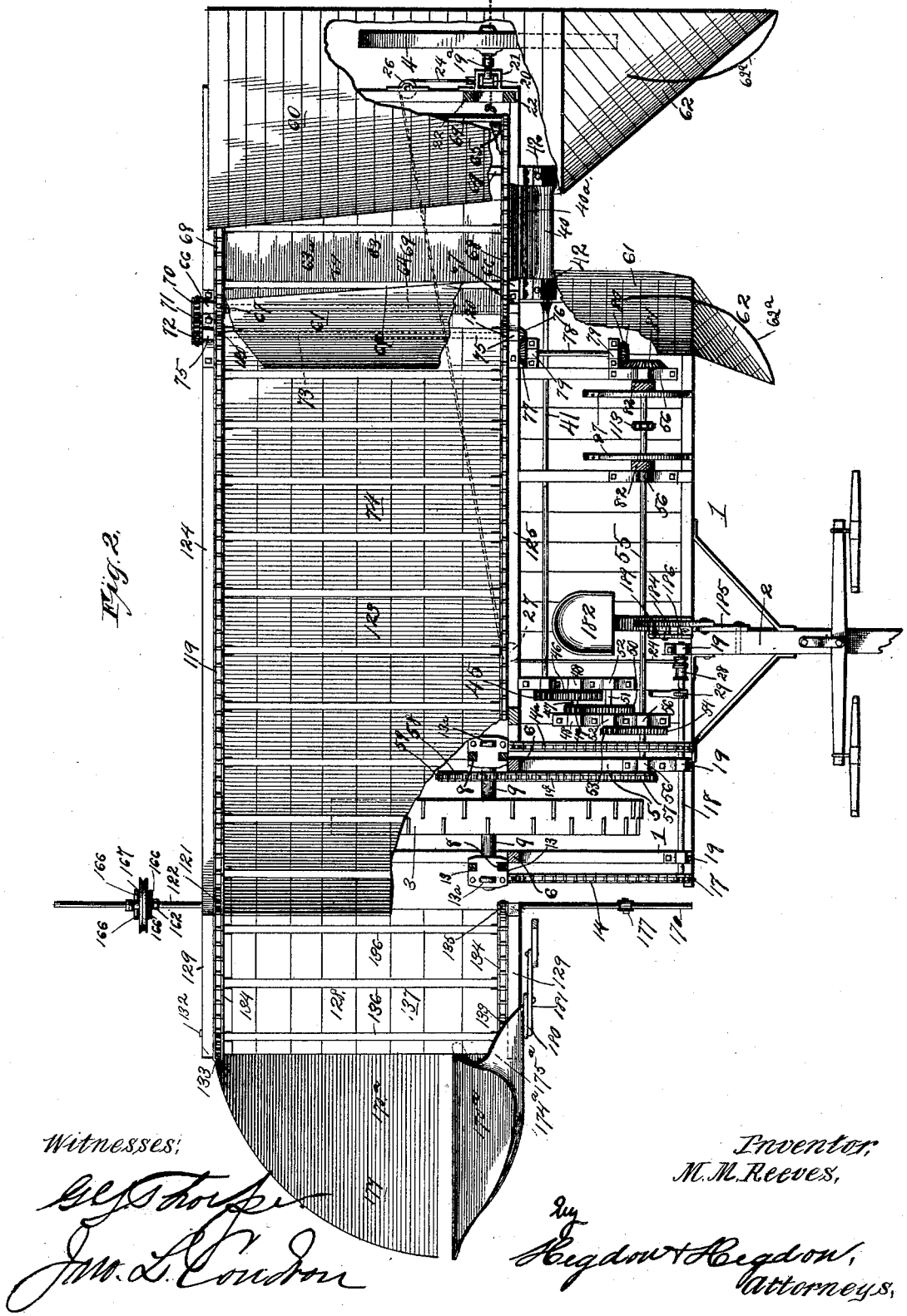
Witnesses:
Inventor:
M. M. Reeves,
by Higdon & Higdon,
Attorneys.

(No Model.) 5 Sheets—Sheet 3.
M. M. REEVES.
CORN AND CANE HARVESTER.
No. 466,835. Patented Jan. 12, 1892.
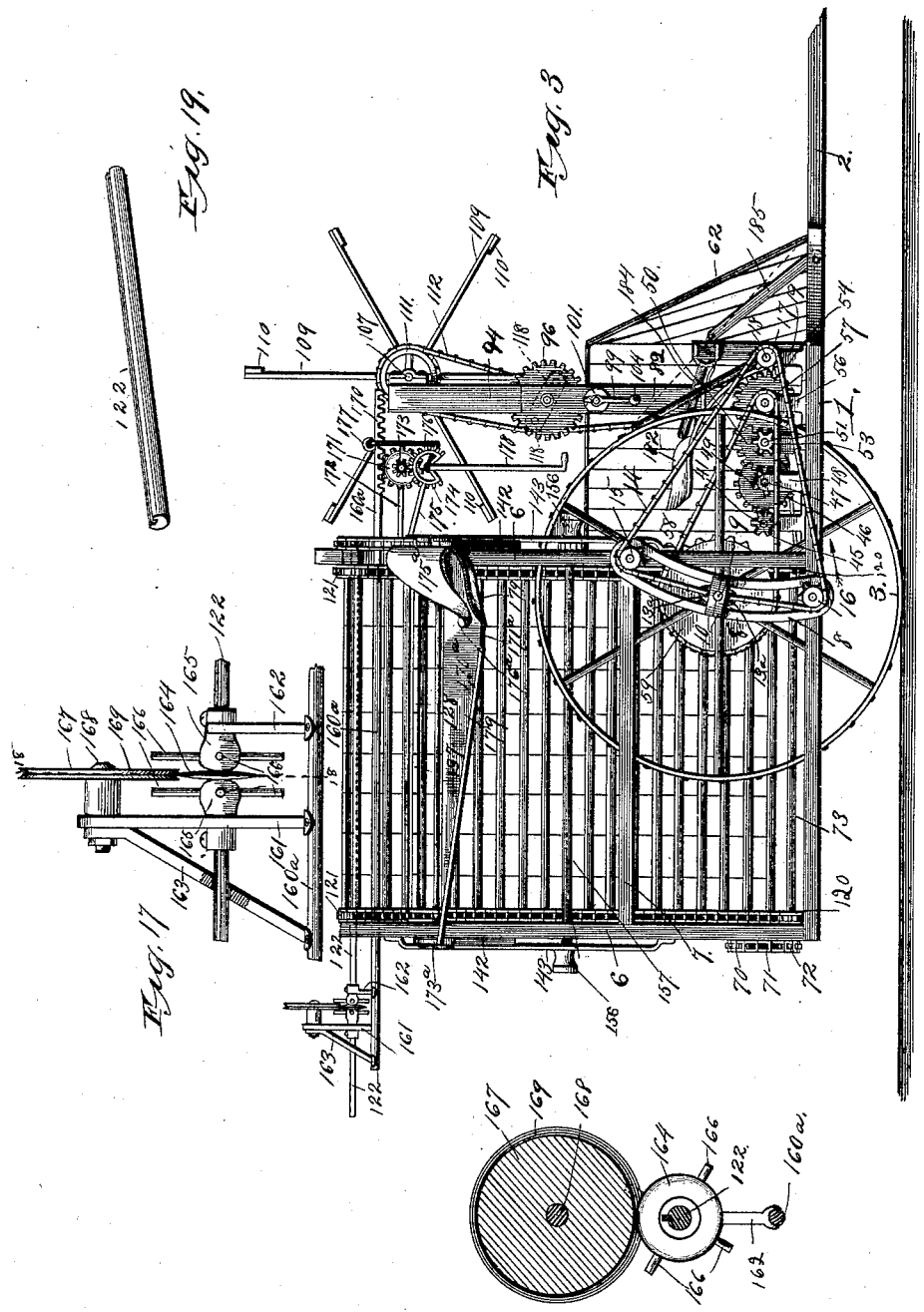
Witnesses:
Inventor,
M. M. Reeves,
by
Higdon & Higdon
Attorneys, (No Model.) 5 Sheets—Sheet 4.
M. M. REEVES.
CORN AND CANE HARVESTER.
No. 466,835. Patented Jan. 12, 1892.
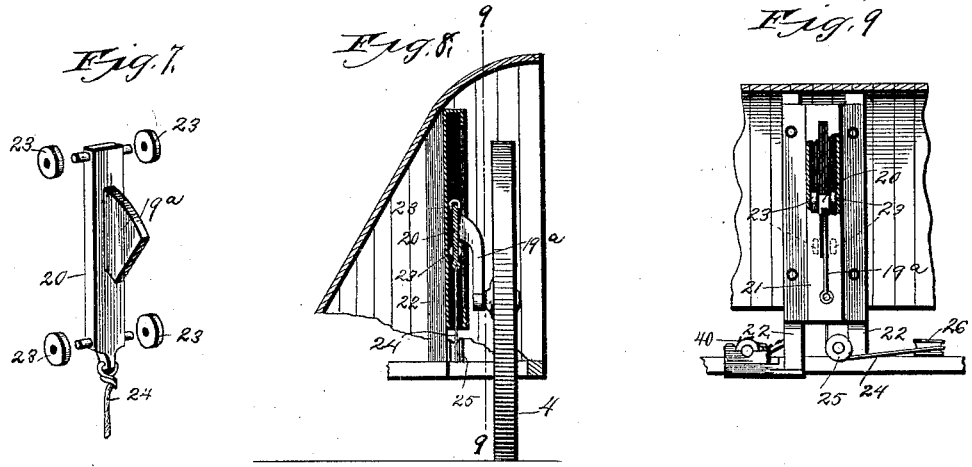
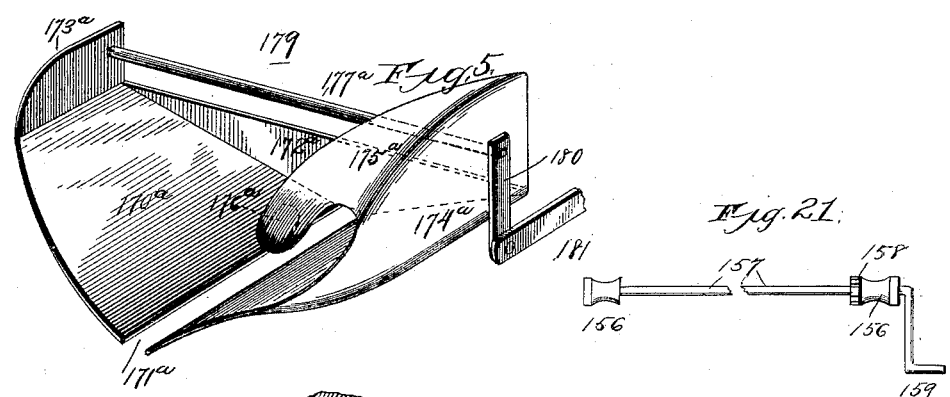
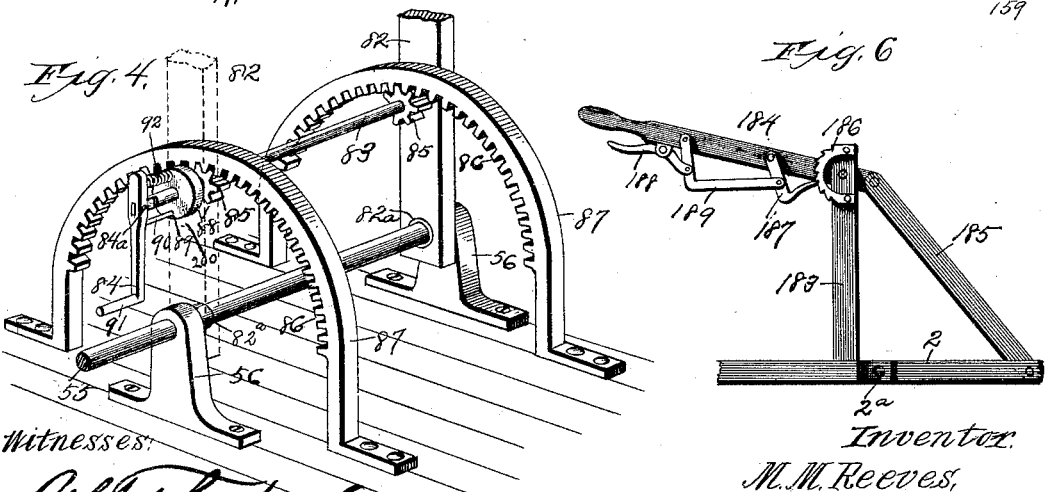
Witnesses:
Inventor:
M. M. Reeves, (No Model.)　　　　　M. M. REEVES.　　　5 Sheets—Sheet 5.
CORN AND CANE HARVESTER.
No. 466,835.　　　　　　　　Patented Jan. 12, 1892.
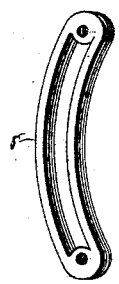
Fig. 14.
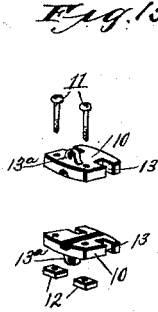
Fig. 15.
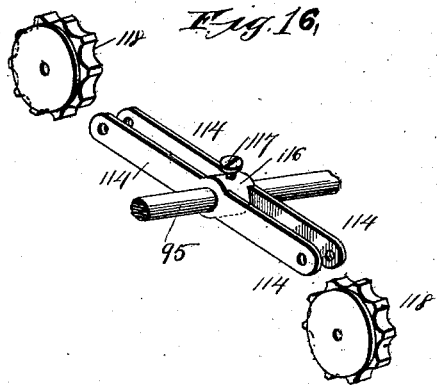
Fig. 16.
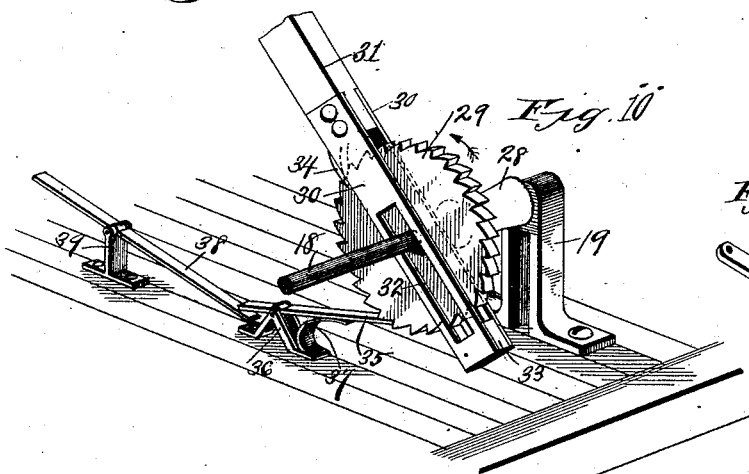
Fig. 10.
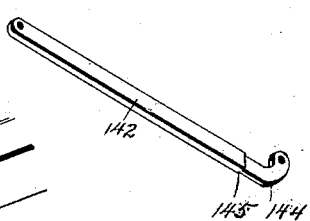
Fig. 20.
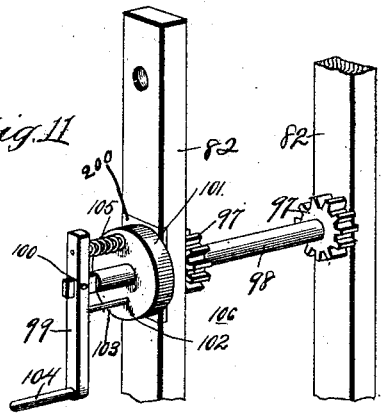
Fig. 11.
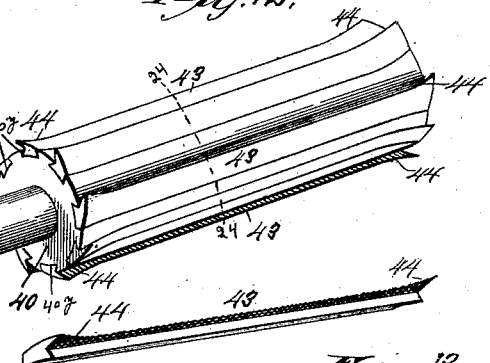
Fig. 12.
Fig. 13.
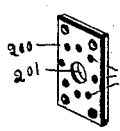
Fig. 22.
Witnesses:
Inventor:
M. M. Reeves.
Higdon & Higdon
Attorneys.

UNITED STATES PATENT OFFICE.

MILLARD M. REEVES, OF CARROLLTON, MISSOURI.

CORN AND CANE HARVESTER.

SPECIFICATION forming part of Letters Patent No. 466,835, dated January 12, 1892.

Application filed May 28, 1891. Serial No. 394,351. (No model.)

*To all whom it may concern:*

Be it known that I, MILLARD M. REEVES, of Carrollton, Carroll county, Missouri, have invented certain new and useful Improvements in Corn and Cane Harvesters, of which the following is a full, clear, and exact description.

My invention relates to machines for cutting cornstalks, cane, and similar crops while said crops are standing in the field; and the objects of my invention are to provide a simple, durable, and compraratively inexpensive machine which shall operate directly and with great rapidity to cut the cornstalks or canes, remove the tops from the cane, and discharge the stalks or canes into a suitable vehicle traveling beside the harvester; furthermore, to produce a corn and cane harvester which will operate to cut the stalks or canes closer to or farther from the ground, as desired, and which shall be so constructed and arranged that all of the adjustments of its working parts can be conveniently managed by an attendant seated upon the machine and carried thereby.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a front elevation of a corn and cane harvester embodying my invention. Fig. 2 is a plan view of the same. Fig. 3 is a side elevation of the same, looking at the stubble side of the machine. Fig. 4 is a detached perspective view of the adjusting mechanism for the lower reel-support. Fig. 5 is a detached perspective view of the device for turning the stalks while being discharged from the machine. Fig. 6 is a detached view in side elevation of the devices for tilting the machine-frame on its axles. Fig. 7 is a detached perspective view of the adjustable bearing for the carrying-wheel at the grain side of the machine. Fig. 8 is a transverse vertical section on the line 8 8 of Fig. 2. Fig. 9 is a vertical cross-section on the line 9 9 of Fig. 8. Fig. 10 is a detached perspective view of the devices for regulating the height of cut of the machine. Fig. 11 is a detached perspective view of the devices for adjusting the upper reel-supports. Fig. 12 is a detached perspective view of the cutter-carrier. Fig. 13 is a detached pespective view of one of the cutters. Fig. 14 is a detached perspective view of one of the sector-supports for the stubble side of the machine. Fig. 15 is a detached perspective view of one of the bearings for the axle of the stubble-wheel of the machine. Fig. 16 is a detached perspective view of the support for the tension-wheels of the reel-driving sprocket-chain. Fig. 17 is a detached view in side elevation of the mechanism for cutting off the tops of the cane-stalks. Fig. 18 is a transverse vertical section of the same on the line 18 18 of Fig. 17. Fig. 19 is a detached view of the shaft of the cutter-disk. Fig. 20 is a detached view of one of the discharge-carrier supports. Fig. 21 is a detached view of the drum-shaft of the discharge-carrier and its drums. Fig. 22 is a detached perspective view of one of the perforated bearing-plates of the lower and upper reel-supports. Fig. 23 is a transverse vertical section of the corrugated bridge on the line 23 23 of Fig. 1.

In the said drawings, 1 designates the framework of the machine, the said frame-work consisting of a number of beams connected together endwise, so as to form the sides and ends of a rectangular frame, to the front part of which is pivotally connected the rear end of a suitable tongue 2, the draft-animals being harnessed to said tongue and traveling at opposite sides of a stubble-row in order to properly propel the machine for its work.

3 designates the carrying-wheel at the stubble side of the machine, and 4 designates the carrying-wheel at the grain side of the same. The stubble-wheel 3 is connected to the machine in the following manner:

5 designates a longitudinal frame-beam of the machine, which is located parallel with and at some distance from the inner side of the longitudinal frame-beam 1 of the stubble side of the machine, the stubble-wheel 3 traveling in the space between these two beams. Upon these two beams are placed four uprights 6, which are connected together in two longitudinal pairs by cross-braces 7, located about midway of the height of the said uprights.

8 designates two sector-shaped skeleton guide-frames, one of which is bolted at its lower end to the outer side of the side beam 1, just back of the point of juncture of the front outer upright 6 with said beam 1, while the upper end of said sector-frame is bolted to the outer side of said front outer upright at the point of juncture with the outer cross-brace 7. The inner sector-frame is bolted at its lower end to the outer side of the inner frame-beam 5 at a point just back of its juncture with the inner front upright 6, while the upper end of said inner sector-frame is bolted to said inner front upright 6 at the point of its juncture with the inner cross-brace 7, it being thus understood that these two sector-frames are located opposite each other and occupy positions substantially concentric to the shaft 18, hereinafter described.

9 designates the axle of the stubble-wheel 3, said axle being of such length as to extend at its ends into the open sector guide-frames 8, just described. Each end of this axle 9 is embraced by two bearing-blocks 10, which are secured together by vertical bolts 11, passing downward through the two parts of the bearing and secured by nuts 12, screwed upon the lower ends of said bolts. Each of these bearing-plates is of greater width than the width of the opening in the guide-frame, and is provided at opposite sides with recesses 13, which embrace the inner surfaces of the opposite sides of the guide-frames, and thus the movable bearings are retained in operative connection with the guide-frames. Upon the upper and under sides of the upper and lower bearing-plates 10, respectively, are formed lugs 13ª, to the stubbleward pair of which are connected the ends of two oppositely-extending portions or strands of a sprocket-chain 14, which chain also passes over a sprocket-pinion 15 at the upper end of the outer sector guide-frame and under sprocket-pinion 16 at the lower end of said outer frame. The sprocket-chain 14 also runs over a sprocket-pinion 17, which is mounted upon the outer end of a shaft 18, before referred to, said shaft being mounted horizontally in standards 19 on the front of the machine-frame. A similar sprocket-chain 14ª is applied in exactly the same manner to the bearing 10 of the inner end of the axle 9, said chain being led over sprocket-pinions at the upper and lower ends of the inner guide-sector and over a second sprocket-pinion on the shaft 18, all of said pinions being precisely like those just previously described.

The axle of the grain-wheel 4 extends outwardly from the lower end of an arm 19ª, the upper end of which is secured to or formed upon a slide 20. This slide 20 works in a vertical housing 21, which is secured to a pair of uprights 22, resting upon the frame 1 of the machine. In order to lessen the working friction of this slide, it is preferably provided at each side with a pair of anti-friction wheels or rollers 23, journaled at the upper and lower ends of the slide. To the lower end of this slide 20 is connected one end of a cord or rope 24, preferably of wire, which extends downward from the slide and beneath a sheave 25, mounted upon the machine-frame directly beneath the slide. From this sheave 25 the cord or rope passes around a sheave 26, mounted upon the grain side of the machine-frame back of the sheave 25. From the sheave 26 the rope or cord 24 extends obliquely forward and toward the stubble side of the machine, and passes around a sheave 27, mounted upon the machine-frame, said rope or cord then extending forward and passing around a drum 28, which is mounted upon the opposte end of the shaft 18 from that which carries the pinion 17. Upon this shaft 18 is mounted a ratchet-wheel 29, which is inclosed at either side by two elongated plates 30, (see Fig. 10,) which are secured to the lower end of an operating-lever 31. Each of these plates is formed with an elongated opening or slot 32, through which the shaft 18 passes, the lower ends of said plates being connected by a block 33. The lower end of the lever 31 carries a rearwardly and downwardly extending tooth or pawl 34, as shown.

35 designates a detent-pawl, which is pivotally connected to a standard 36, secured to the front part of the machine-frame, the front end of said pawl being held normally upward into engagement with the teeth of the ratchet-wheel 29 by a spring 37. The rear end of the detent-pawl 35 is engaged from beneath by the front end of a foot-lever 38, which is pivoted upon a standard 39, secured to the frame of the machine back of the standard 36. The mechanism thus described constitutes the means for causing the machine to cut nearer to or farther from the ground, as desired, and it will be seen that by repeatedly moving the lever 31 backward its tooth 34 will engage the teeth of the ratchet-wheel 29, rotating the ratchet-wheel and the shaft 18 backward or in the direction of the arrow in Fig. 10, and will thus wind the cord or rope 24 upon the drum 28, and will also draw upon the lower strands of the sprocket-chains 14, causing them to move in the direction indicated by the arrow in Fig. 3, and thus lift both sides of the frame evenly to the required height, the detent-pawl 35 retaining the machine in such position.

When it is desired to lower the machine, the attendant presses his foot upon the inner end of the lever 38 and at the same time lifts the lever 31 upward, so as to move the pawl 34 out of engagement with the teeth of said ratchet-wheel, thus moving the front end of the detent-pawl 35 also out of engagement with the teeth of the ratchet-wheel and allowing the machine to effect its descent by its own weight as far as required, the cord 24 unwinding from the drum 28 and the sprocket-chains 14 moving in the direction opposite from that indicated by the arrow in Fig. 3. When the machine has descended as far as desired, the foot-lever 38 is released, so that the spring 27 can throw the front end of the detent-pawl into engagement with the teeth of the ratchet-wheel, and thus stop the descent of the machine and sustain the machine in its lowered position.

In order to tilt the frame of the machine upon its axles, the following mechanism may be employed: 183 (see Fig. 6) designates a vertical standard which is secured to the front of the machine adjacent to the pivot $2^a$, connecting the rear end of the tongue 2 therewith. To the upper end of this standard is pivotally connected a lever 184, the outer or forward end of which is pivotally connected to the upper end of a link-bar 185, the opposite or forward end of said bar being pivotally connected to the tongue in front of its pivot $2^a$. A ratchet-segment 186 is secured to the upper part of the standard 183, and said ratchet-segment is engaged by a pawl 187, operated by a pawl-grip 188 through the medium of a link-bar 189, which is pivoted upon the lever, as shown. Thus by releasing the pawl from the rack-segment and moving the free end of the lever upward or downward the front of the machine can be lowered or raised, as desired.

40 designates the cutter-carrier of the machine, which is of elongated cylindrical form and is mounted horizontally at the grain side of the machine, and is connected by a squared or angular end $40^x$ with the corresponding end of an actuating-shaft 41, the said cutter-carrier being journaled in bearings 42 at the grain side of the machine. This cutter-carrier carries upon its surface a number of elongated cutting-blades 43, the base of each of which is dovetailed into a dovetail groove $40^y$, extending longitudinally of the carrier 40. By thus attaching the cutters to the cutter-carrier there is no possibility of the cutters being thrown off by the revolution of the carrier, and said cutters can be removed only by first disconnecting the carrier from its shaft 41 and then drawing the cutters lengthwise out of their sockets in the carrier, the arrangement of the sockets $40^y$ rendering such removal of the cutters easy to accomplish. The cutting-edge of each cutter 43 is serrated and is dished from its ends toward its center, substantially as shown at 44, so that the cutters operate with a shearing or drawing cut and carry the stocks toward the center of the carrier, thereby insuring the cutting of all the stalks in the row whether the row be precisely straight or irregular. Upon the opposite end of the shaft 41 from that which carries the cutter-carrier is mounted a gear-pinion 45, which meshes with a gear-wheel 46, the latter being mounted upon a shaft 47, which is journaled horizontally in bearing-standards 48, mounted upon the front part of the machine-frame. This shaft 47 also carries a gear-pinion 49, which meshes with a gear-wheel 50, mounted upon a shaft 51, the said shaft being journaled in bearing-standards 52, also supported upon the front part of the machine-frame. The shaft 51 also carries a gear-pinion 53, which meshes with a gear-wheel 54 upon a long shaft 55, which is journaled in four bearing-standards 56 upon the front of the machine-frame, the said shaft 55 extending almost entirely across the front part of the machine-frame. Upon its stubble end this shaft 55 carries a sprocket-pinion 57, over which runs a sprocket-chain 58, which also runs over a sprocket-wheel 59 upon the inner part of the axle 9 of the stubble-wheel 3. It will thus be seen that as the machine is drawn forward the shaft 55 will be rotated, and, acting through the train of gearing above described, will impart rapid rotation to the cutter-cylinder, the direction of rotation of said cylinder being such that its front side portion moves upward, causing the cutters or knives to operate with an upward stroke, and thus effectively sever the stalks or canes at their butts.

Upon the grain side of the machine are mounted two gatherers 60 and 61, which are in the form of slatted frames, canvas, or other similarly light and strong material, and which extend forward from the rear side of the machine-frame. The front portions 62 of these gatherers diverge forwardly, so as to completely embrace the row of stalks and deflect them inward toward the cutter and toward a gathering-reel, to be hereinafter described, and the rear portions of said gatherers incline upwardly and away from each other and rearwardly toward the stubble side of the machine. The lower edge of the inner gatherer 61 extends a considerable distance above a conveyer 63 at the rear of the cutters, so as to allow the cut stalks to be carried by the conveyer freely beneath said lower edge of the gatherer 61, while the lower edge of the outer gatherer likewise clears the upper surface of the conveyer.

$62^a$ designate two curved rods or bars, each of which is secured at one end to the outer divergent parts of the gatherers 60 61, and which extend obliquely rearward and upward and serve to assist the outer portions of the gatherers in effecting their described operations. These rods or bars may, if desired, be omitted from the machine, but are useful in gathering stiff stalks or canes. The purpose of the peculiar rearward inclination of the gatherers toward the stubble side of the machine is that the tops of the stalks striking, as the stalks fall after being cut, against the inclined surfaces of the gatherers cause the tops to catch up in speed with the butts of the stalks, and thus insure the dropping of the stalks exactly across the conveyer, and thus also insures the proper feeding of the stalks to the elevator by the conveyer. This conveyer consists of a number of bars 69, extending longitudinally of the machine and connected at their ends to two endless sprocket-chains 68, which run over four sprocket-pinions 67, which are mounted upon the ends of two shafts 64 65 of the conveyer, the shaft 65 being the outer shaft and the shaft 64 being the inner shaft of said conveyer. A flooring 63ª extends longitudinally beneath this conveyer and supports the stalks or canes while being conveyed to the elevator to be hereinafter described. Upon the rear end of the inner shaft 64 of the conveyer is mounted a sprocket-pinion 70, over which runs a sprocket-chain 71, the said chain running also over a similar sprocket-pinion 72 on the rear end of the lower shaft 73 of the elevator 74. This latter shaft 73 extends longitudinally of the machine-frame just below the shaft 64 and slightly toward the stubble side therefrom, and is journaled at its ends in bearing-standards 75 on the machine-frame. At its front end this shaft 73 carries a beveled gear 76, which meshes with a beveled gear 77 on the rear end of a longitudinal shaft 78, said shaft 78 being mounted in bearing-standards 79 upon the front part of the machine-frame. Upon its front end this shaft 78 carries a beveled gear-pinion 80, which meshes with a similar gear-pinion 81 upon the grain-side end of the shaft 55, before described. It will thus be seen that as the shaft 55 is rotated, as previously described, such rotation will be imparted through the shaft 78 to the roller 73 as to cause the upper part of the elevator 74 to travel away from the grain side toward the stubble side of the machine, and it will also be seen that this rotation of the shaft will, through the sprocket-chain 71, produce such a rotation of the roller 64 as will cause the upper part of the conveyer to travel likewise from the grain side toward the stubble side of the machine. The purposes of these movements of the conveyer and elevator will be hereinafter fully explained. Between the rear side of the cutter-cylinder 40 and the front side of the conveyers 63 is mounted a bridge-piece 40ª, which is of corrugated metal, and which serves to support the butt-ends of the stalks after they have been cut and while the stalks are passing from the cutter to the conveyer and carriers. The front edge of the bridge is made very sharp, as shown in Fig. 23, and lies close to the rear side of the cutter-cylinder, thus serving to cut up any substances which would otherwise wrap themselves around the cylinder and clog the same.

82 designates the two lower sections of a reel-support, the lower ends of said lower sections embracing each a hollow stud 82ª, which forms a part of and projects inwardly from the adjacent sides of two of the bearing-standards 56 of the shaft 55, and which also encircle said shaft. At a point above the shaft 55 these two lower reel-support sections are connected by a horizontal shaft 83, one end of which extends beyond the outer side of one of the reel-support sections and carries a crank-handle 84, the said crank-handle being pivoted upon this end of the shaft 83 by a cross-pin 84ª. This shaft 83 carries near each end a gear-pinion 85, and each of these pinions meshes with the teeth 86 of a segmental rack 87, the two racks being arranged vertically upon the machine-frame, and having their teeth 86 formed on their under sides. It will thus be seen that by turning the crank-handle 84 the gear-pinions 85 will, by their engagement with the rack-teeth 86, cause the support-sections 82 to incline more or less from a perpendicular position, as desired, and for a purpose which will be presently explained. One of these gear-pinions 85 is adjacent to the inner side of each of the support-sections 82, and upon the shaft 83, near that end which carries the crank-handle 84, is mounted a disk 88, which is closely adjacent to the corresponding supporting-section 82, and which also turns with the shaft 83. Through this disk 88, at a point at one side of its center, is formed a transverse opening 89, into which extends a pin 90. The opposite end of this pin 90 is inserted into the crank-handle 84 at a point between its pivot-pin 84ª and its handle 91.

92 designates a coiled spring, one end of which is connected to the outer side of the disk 88, while its opposite end is connected to the opposite extremity of the crank-arm 84 from that which carries the crank-handle 91. Thus it will be seen that the expansive action of the spring 92 serves to retain the pin within the opening 89 of disk 88, and also serves to force said pin through said disk and into one or another of a series of holes or recesses 93, which are formed in a plate 200, (see Fig. 22,) secured to an adjacent part of the outer side of the support-section 82 and having a central opening 201 for the passage of the shaft 83. Thus it will be seen that when the supports have been inclined more or less by the turning of the shaft 83, as above described, the pin 90 will, when the handle 84 is released, be thrown into one or the other of the openings or recesses 93, thus locking the shaft against turning, and so in connection with the rack-teeth 86 and gear-pinions 85 retain the supports in the desired position. Upon the upper end of each lower reel-support section 82 is pivoted an upper reel-support section 94, a shaft 95 (see also Fig. 16) serving as the pivotal connection of said upper and lower support-sections. On the inner side of each upper support-section 94 is secured a circular gear-rack 96, the said circular racks being concentric to the shaft 95. The teeth of these circular racks are engaged by gear-pinions 97, there being thus two of these gear-pinions, which are located close to the inner sides of the lower reel-support sections 82, and which are mounted upon a shaft 98 so as to turn therewith. This shaft 98 connects the upper ends of the two lower reel-support sections 82, and at one end extends through and projects beyond the outer side of one of said support-sections. Upon this outer end of the shaft 98 is mounted a crank-arm 99, which is pivoted to the end of the shaft by a cross-pin 100. Upon the shaft 98, between the crank 99 and the outer side of the adjacent reel-support section 82, is mounted a disk 101, having a single hole 102 and arranged to turn with said shaft 98. This hole 102 serves as a guide for a pin 103, which projects from the crank-arm 99 at a point between its connection with the shaft and its crank-handle 104. 105 designates a coiled spring, one end of which is connected to the outer end of the disk 101, and the opposite end of which is connected to the opposite end of the crank-arm 99 from that which carries the crank-handle 104. Thus the spring by its expansive action serves to force the pin 103 inward through the disk 101 and into one of a series of circular holes or recesses 93 in a plate 200, (see also Fig. 22,) which is similar to the plate before described, and which is secured to the outer side of the adjacent support-section 82, and through the central opening 201 of which extends the shaft 98, and by the combined action of the cogs 97 and circular racks 96 to retain the upper reel-sections 94 in tilted position. When it is desired to tilt the upper sections 94, the crank-arm 99 is turned as much as desired and then released, the action being similar to that of the handle 84, before described.

In the upper ends of the upper reel-support sections 94 is journaled the reel-shaft 107, to the grain-side end of which is secured the hub 108 of the reel, the said reel consisting of a number of oblique outwardly and radially extending arms 109, to the outer ends of each pair of which are secured the reel-blades 110. The said blades extend horizontally outward from the grain side of the machine, as shown. Upon the shaft 107, at a point midway between the two support-sections 94, is mounted a sprocket-wheel 111, over which runs a sprocket-chain 112, which also extends downwardly and runs beneath a sprocket-wheel 113, similarly secured upon the shaft 55. It will thus be seen that as the shaft 55 is revolved, as above described, the reel will, through the medium of the sprocket-wheels 111 and 113 and the sprocket-chain 112, be rotated, so that its lower part will move backward and thus strike the tops of the stalks or canes and bend them toward the cutter, the reel being raised and lowered and forwardly inclined in order to strike the tops of both taller and shorter stalks or canes by the described manipulations of the crank-arms 84 and 99. In order to prevent any sagging of the sprocket-chain 112 as the reel-supports are tilted, a hub 116 is secured upon the shaft 95 midway between the reel-supports 94 by a set-screw 117, and from the opposite sides of this hub extend two pairs of arms 114, between the outer ends of each pair of which is journaled a sprocket-pinion 118. The sprocket-chain 112 passes to the rear side of each of these pinions, and thus it will be seen that as the reel-supports are tilted the chain will be prevented by the sprocket-pinions from sagging and dropping out of engagement with its sprocket-wheels, and its working tension will thus be always maintained.

The elevator 74 consists of a number of bars (preferably of wood) which are connected at their ends to two endless spocket-chains 119, said sprocket-chains running over two sprocket-pinions 120, which are mounted upon the lower shaft 73 of the elevator. These sprocket-chains also run over two sprocket-pinions 121, which are mounted upon a shaft 122, said shaft being journaled in the upper end of the elevator-frame. This elevator-frame consists of a flooring 123, which is located immediately beneath the upper strand of the elevator, and which is secured at its ends in side pieces 124, which extend obliquely upward to the stubble side of the machine, and the upper portions of which are supported by the uprights 6, previously described. The shaft 122 is journaled in the upper ends of the side pieces 124, and upon the front side piece 124 is mounted a butt-board 125. This board serves to keep the butt-ends of the stalks or canes from falling off of the front side of the elevator, and said board is retained in position by short bars 126, which enter metal straps 127 on the outer side of the front side strip 124.

128 designates a discharge-carrier, which is composed of a pair of elongated side strips 129, each of which is pivotally connected at its inner end to the outer part of the machine by a shaft 131, said shaft being journaled at its ends in brackets 130, secured to the outer sides of the upper parts of the two outer uprights 6. The outer ends of these side pieces 129 are connected together by a shaft 132. This shaft 132 carries near each end a sprocket-pinion 133, and over these two sprocket-pinions run two endless sprocket-chains 134, which also run over a pair of sprocket-pinions 135 on the shaft 131 at the inner end of the discharge-conveyer. Between these two sprocket-chains 134 extend a number of cross-bars 136. A flooring 137 is interposed between the two strands of the discharge-carrier, and is secured in the two side pieces or strips 129. A sprocket-pinion 138 is mounted upon the front end of the inner shaft 131, and a sprocket-chain 139 runs under this sprocket-pinion and also upward over a similar sprocket-pinion 140, which is mounted upon the front end of the shaft 122. By virtue of this arrangement it will be seen that as the elevator-belt moves upward and outward at its upper side the discharge-carrier also moves outward at its upper part. The forward side strip 129 of the discharge-carrier is provided with a butt-board 141, which serves substantially the same purpose as the butt-board of the elevator 74. In order to vary the inclination of the discharge-carrier so as to accord with the different heights of wagons an arm 142 is pivoted at its outer end to each side strip of the discharge-carrier, and the inner ends of these arms work within spaces between the outer sides of the uprights 6 and elongated vertical guides 143, which are secured to said uprights, the inner end 144 of each arm 142 being of less thickness than the body portion of the arm, so as to form oppositely-disposed shoulders 145, which rest against the sides of the uprights and guides, and thus retain the arms 142 at all times in operative position. To the inner ends of these arms 142 are connected cords 146, which are preferably of wire, and which extend thence up over sheaves 147, which are journaled in the upper parts of the guides 143 and uprights 6. From the sheaves 147 the cords 146 extend to and are wound around drums 156, each of which is mounted so as to turn with a shaft 157, which is mounted horizontally upon the two inside uprights 6, one of the drums 156 being located adjacent to the rear side of the rear inner standard or upright and the other drum being located adjacent to the front side of the front inner standard or upright. The rear end of the front drum 156 is provided with a ratchet-section 158, which is engaged by a pawl 159, pivoted above the drum on the front side of the upright 6. The front end of the shaft 157 carries a crank-arm 160, and the arrangement is such that by turning the crank-arm in one direction the cords 146 will be wound upon the drums, and the discharge-carrier will be rendered as nearly horizontal as desired, and will be retained in such position by the pawl 159. When it is desired to lower the outer end of the discharge-carrier, the pawl 159 is moved out of engagement with the ratchet-section 158 and the crank-arm 160 is turned in the reverse direction, so as to unwind the cords from the drums as much as required, the pawl being finally again engaged with the ratchet, so as to retain the carrier in its lower position.

As the stalks of cane reach the upper end of the elevator and are about to pass out of the discharge-carrier, it is desirable that their tops should be removed, and I have provided the following mechanism for accomplishing this result, $160^a$ designates a long rod or bar which is mounted horizontally in bearings in the upper ends of the side pieces 124 of the elevator in such manner as to move longitudinally therein but not to rotate, the said rod or bar extending forwardly and rearwardly of the machine and always projecting from the rear side of the elevator-frame. Upon the rear portion of this bar are mounted two vertical standards 161 162 and a third inclined standard 163, which braces the rear vertical standard 161. Through these standards extend the rear end of the upper shaft 122 of the elevator, the said shaft being provided on its upper side with a spline which extends throughout its projecting rear portion. Upon this portion of the shaft 122, between the two vertical standards 161 and 162, is mounted a cutting-disk 164, and on either side of said cutting-disk a hub 165, the two hubs having each a number of radial arms 166, which operate as force-feeders for carrying the tops of the stalks or canes through the cutting mechanism. These hubs and the disk are each provided with a feather, which enters the spline of the shaft 122, the arrangement being such that the disk and hubs can be moved longitudinally upon the shaft 122 and shall at the same time revolve with said shaft, as will be presently described. In the upper ends of the standards 161 and 163 is secured a stud-shaft 168, upon which is journaled a disk 167, the periphery of which is provided with a circular recess or groove 169 to receive the cutting-edge of the cutting-disk 164, the disk 167 being thus rotated by frictional contact with the disk 164. The under side of the front end portion of the rod or bar $160^a$ is provided with a rack-section 170, the teeth of which are engaged by a gear-wheel 171, which is journaled in the outer end of a horizontal bracket 172, the opposite end of which is secured to the upper end of the front inner upright 6. The hub of this gear-wheel carries a gear-pinion 173, which is engaged by a gear-segment 174, journaled upon the outer portion of a hanger 175, the opposite end of said hanger being also secured to the upper part of the inner front upright 6. At its outer end the hanger 175 is provided with a vertical arm 176, in the upper end of which is journaled a roller 177, which rests upon the upper side of the longitudinally-movable rod or bar $160^a$, and thus retains the rack, gear-wheel, gear-pinion, and gear-segment in operative engagement. The gear-segment 174 is provided with a rigid pendent handle-arm 178, and it will be seen that by moving this handle-arm in one or the opposite direction the top-cutting mechanism just described can be moved forward or backward upon the shaft 122 without affecting the revoluble action of the same, and thus causing the tops of both longer and shorter stalks of cane to be cut off at such lengths as may be desired. The tops of the stalks or cane, after having been thus severed, are either allowed to drop upon the field, or, if preferred, may be received by a suitable box or other receptacle secured to any rear portion of the machine, so as to properly receive them. If desired, the cutting mechanism just described may be dispensed with, the rod $160^a$ and its operative connections being removed from the machine.

In order to cause the stalks or canes to finally leave the harvester endwise instead of sidewise, as they would if dropped directly by the discharge-carrier, and thus deposit the stalks or canes longitudinally of the body of a wagon drawn along beside the stubble side of the machine, I have provided the following attachment: 179 designates a discharge-deflector, which is preferably of sheet metal, and which is constructed with two downwardly-inclined and convergent bottom pieces $170^a$, which are separated at their inner ends or edges, so as to leave a long opening $171^a$. At their inner edges these bottom pieces are connected by a back piece 172ª, and the rear edge of the rear bottom piece is provided with an upwardly-extending portion 173ª, constituting one side of the deflector. The front edge of the front bottom piece 170ª is provided with an upwardly-extending portion 174ª, the upper part 175ª of which extends spirally rearward and downward and terminates at its outer end in an extension or tongue 176ª, which projects spirally rearward and downward. This discharge-deflector is pivotally attached to the outer part of the discharge-carrier by a shaft 177ª, which passes transversely through the inner parts of the sides 173ª and 174ª of the deflector, and which also passes through the side pieces 129 of the discharge-carriers at such a point that the outer end of said carrier extends into and above the bottom portion of the rear or inner part of the deflector. To the front end of this shaft is connected an arm 180, to the free end of which is pivotally connected the outer end of the link-bar 181, the inner end of which is pivotally connected to the outer part of the front supporting and adjusting arm 142 of the discharge-carrier. It will thus be seen that as the discharge-carrier is raised and lowered the discharge-deflector will be always maintained in a horizontal position, and also that as the stalks are dropped upon the deflector by the discharge-carrier the deflector quickly turns the falling stalks so that they drop through the opening 171ª in such manner as to fall crosswise into the body of a wagon or other vehicle being drawn beside the stubble side of the machine.

The operations of the several parts of the machine have for the sake of clearness been described throughout the above description, so that it is believed that no general description of the entire operation of the whole mechanism is necessary.

From the above description it will be seen that the machine operates with great rapidity and effectiveness, cutting, elevating, topping or heading, and discharging the stalks or canes automatically. It will also be seen that all of the various adjustments of which the machine is capable can be effected by the driver or attendant while seated upon the seat 182 at the front of the machine.

It will be understood from the foregoing description of the discharge-deflector and its connections with the discharge-carrier that the deflector can, whenever desired, be readily detached from the discharge-carrier, and that the stalks or canes can be discharged directly from the discharge-carrier. It will be further understood that by serrating the cutters from the upper side outward throughout the width of the blade of the cutter the serrations will not be destroyed by sharpening the cutters.

Having thus described my invention, what I claim as new therein, and desire to secure by Letters Patent, is—

1. An improved corn and cane harvester comprising a suitable body or frame, a carrying-wheel located at the stubble side of the machine and operating also as the drive-wheel of the machine, a pair of open sector guide-frames mounted vertically at opposite sides of said wheel and both at the stubble side of the machine, a pair of bearings for the axle of the wheel, each of which is mounted movably within one of the sector guide-frames, a pair of sprocket-pinions, one of which is mounted at each end of said sector-frame, and a revoluble shaft mounted upon the front of the machine-frame and carrying a pair of sprocket-chains, each extending over one of the sprocket-pinions of the shaft and over the upper and lower sprocket-pinions of one of the sector-frames, and each connected at its ends to the upper and lower sides of one of the movable bearings, substantially as set forth.

2. An improved corn and cane harvester comprising a suitable body or frame, a carrying-wheel located at the stubble side of the machine and operating also as the drive-wheel of the machine, a pair of open sector guide-frames mounted vertically at opposite sides of said wheel and both at the stubble side of the machine, a pair of bearings for the axle of said wheel, each of which is mounted movably within one of the sector guide-frames, a pair of sprocket-pinions, one of which is mounted at each end of said sector-frames, a revoluble shaft mounted upon the front of the machine-frame and carrying a pair of sprocket-chains, each extending over one of the sprocket-pinions of the shaft and over the upper and lower sprocket-pinions of the sector-frames, and each connected at its ends to the upper and lower sides of one of the movable bearings, a carrying-wheel located at the grain side of the machine, a vertical guide located upon said grain side of the machine, a slide mounted movably in said guide and provided with anti-friction wheels or rollers, a drum mounted upon the revoluble shaft, and a cord or rope connected at one end to the drum and extending around and beneath sheaves on the machine-frame and connected to the lower end of the slide, substantially as set forth.

3. An improved corn and cane harvesting machine comprising a pair of gatherers located at the grain side of the machine and extending forwardly and rearwardly thereof, each of said gatherers diverging forwardly at its front end, and the body portion of the gatherers diverging upwardly away from each other and rearwardly toward the stubble side of the machine, substantially as set forth.

4. An improved corn and cane harvester comprising a cylindrical cutter-carrier located at the grain side of the machine and provided with longitudinal dovetailed peripheral sockets and cutters of elongated form having tongued bases fitting in said sockets and formed with cutting-edges receding from their ends toward their middles, substantially as set forth.

5. An improved corn and cane harvester comprising a rotary cutter located at the grain side of the machine, a horizontal endless conveyer located also at the grain side of the machine back of the cutter, and a corrugated bridge-piece occupying the space between the rear side of the cutter and the front side of the conveyer and having a sharp front edge adjacent to the cutter, substantially as set forth.

6. An improved corn and cane harvester comprising an elevator located at the rear end of the machine and extending upward from near the grain side to the stubble side of the machine and a discharge-carrier located at the upper end of the elevator and composed of an endless carrier, a pair of side strips upon which the carrier-shafts are mounted, a pair of supporting-arms 142, pivoted at their outer ends to the side pieces or strips and working in guides upon the elevator-supports, a revoluble shaft mounted upon the elevator-supporting frame and provided with a pair of winding-drums, and a pair of cords connected each at one end to the inner end of one of the carrier-supports and at their opposite ends to one of the drums, and a pawl pivoted upon one of the elevator-supports and engaging a ratchet-section on one of the drums, substantially as set forth.

7. An improved corn and cane harvester comprising a discharge-carrier located at the stubble side of the machine, a discharge-deflector pivoted upon the outer part of the discharge-carrier and having a downwardly-converging bottom provided with a longitudinally-extending opening, and having also a spirally-curved side portion, substantially as set forth.

8. An improved corn and cane harvester comprising a discharge-carrier located at the stubble side of the machine, a discharge-deflector pivotally connected to the outer end of the discharge-carrier and having a longitudinal opening in its downwardly-inclined bottom and also a spirally-curved side, and a link-bar connected to an arm of the pivotal shaft of the deflector and also pivotally connected to one of a pair of movable supports for the carrier, substantially as set forth.

9. An improved corn and cane harvester comprising an elevator located at the rear end of the machine, a rod or bar mounted horizontally upon the stubble end of said elevator and arranged to slide longitudinally thereon, standards rigidly mounted on said rod or bar, a revoluble shaft mounted in the stubble end of the elevator, a cutter-disk and a pair of feeders mounted upon said shaft so as to turn therewith and so as to move longitudinally thereon, a peripherally-grooved wheel journaled above the cutting-disk and receiving the edge of said disk in its groove, a gear-wheel having a gear-pinioned hub and mounted upon a bracket secured to the front of the elevator-frame, a gear-segment also mounted on a hanger secured to the front of the elevator-frame, a handle-arm pendent from the gear-segment, and a roller mounted upon an arm extending upward from said hanger, said gear-segment meshing with the pinion of the gear-wheel hub, said gear-wheel meshing with a rack upon the under side of the front end of the rod or bar, and said roller resting upon said rod or bar, substantially as set forth.

10. An improved corn and cane harvester comprising a pair of tilting reel-supports composed each of pivoted sections located at the grain side of the machine, a reel-shaft journaled in the upper ends of said supports and carrying a sprocket-pinion, an actuating-shaft mounted upon the frame of the machine and also carrying a sprocket-pinion, a sprocket-chain running over said pinions, and a shaft forming the pivot of the support-sections and having two oppositely-extending arms each carrying a sprocket-pinion, the said sprocket-chain being led over the rear of each of the sprocket-pinions on said arms, substantially as set forth.

11. An improved corn and cane harvester comprising a pair of tilting reel-supports, a pair of rack-segments located near the lower ends of said supports, a shaft extending through said supports and carrying gear-pinions engaging the teeth of the rack, a crank-arm pivoted upon one end of the shaft, a pin carried by the crank-arm and engaging a hole in one of the supports, and a spring operatively connected to one extremity of the crank-arm and serving to hold the pin in engagement with the hole or recess in the support, substantially as set forth.

12. An improved corn and cane harvester comprising a pair of tilting reel-supports, each composed of an upper and a lower section pivotally connected together, a shaft passing through the upper parts of the lower reel-sections and carrying gear-pinions engaging gear-disks, each mounted upon one of the upper support sections, a crank-handle pivoted upon one end of the shaft, a pin carried by said crank-arm and engaging a hole or recess in the adjacent lower support-section, and a spring operatively connected to one end of the crank-arm and serving to retain the pin in engagement with said hole or recess, substantially as set forth.

13. An improved corn and cane harvester comprising a revoluble cutter located at the grain side of the machine, a carrying-wheel located at the stubble side of the machine, an elevator extending obliquely upward from near the grain side of the machine to the stubble side of the same, an endless conveyer at the grain end of the elevator and an endless discharge-conveyer at the stubble end of the elevator, and all located at the rear of the machine-frame and provided with sprocket-chains transmitting movement from the one to the other, a power-shaft extending from the grain side to the stubble side of the machine-frame at the front part of the same and having at its stubble end a sprocket-pinion, a sprocket-chain connecting the sprocket-gear of the drive-wheel with the sprocket-gear of the power-shaft, a train of gear-wheels upon the front of the machine and at the stubble side of the same and connecting the power-shaft with the cutter-shaft, and a counter-shaft at the front part of the grain side of the machine and having beveled gear-pinions meshing with similar pinions upon the grain end of the power-shaft and upon the front end of the lower elevator-shaft, substantially as set forth.

14. An improved corn and cane harvester comprising a pair of gatherers located at the grain side of the machine and converging upwardly away from each other, the inner sides of the gatherers extending obliquely rearward toward the stubble side of the machine, substantially as set forth.

15. An improved corn and cane harvester comprising a pivotally-adjustable discharge-carrier, a discharge-deflector pivotally connected to the outer part of the carrier, a pair of adjusting and supporting arms pivotally connected to the discharge-carriers, and a link-bar pivotally connected to the deflector and to one of the supporting-arms and serving to maintain the deflector in horizontal position, substantially as set forth.

16. An improved corn and cane harvester comprising a cylindrical cutter-carrier located at the grain side of the machine and provided with removable cutters, the cutting-edges of which are serrated and recede from their ends toward their middles, substantially as set forth.

In testimony whereof I affix my signature in presence of two witnesses.

MILLARD M. REEVES.

Witnesses:
 JNO. L. CONDRON,
 H. E. PRICE.